United States Patent [19]
Roerig

[11] 3,766,620
[45] Oct. 23, 1973

[54] CONTROLLED DEFLECTION ROLL DRIVE

[75] Inventor: Arnold J. Roerig, Beloit, Wis.

[73] Assignee: Beloit Corporation, Beloit, Wis.

[22] Filed: Aug. 8, 1972

[21] Appl. No.: 278,737

[52] U.S. Cl. ................................................ 29/115
[51] Int. Cl. ........................................ B60b 15/16
[58] Field of Search ............ 29/115, 116 R, 116 AD

[56] References Cited
UNITED STATES PATENTS

| | | | |
|---|---|---|---|
| 2,676,387 | 4/1954 | McArn | 29/116 AD X |
| 3,276,102 | 10/1966 | Justus | 29/113 AD X |
| 3,290,897 | 12/1966 | Kuehn | 29/115 X |
| 3,407,679 | 10/1968 | Berzins | 29/115 X |
| 3,419,890 | 12/1968 | Justus | 29/115 |
| 3,562,882 | 2/1971 | Widmer et al. | 29/115 |
| 3,639,956 | 2/1972 | Justus | 29/115 X |

Primary Examiner—Alfred R. Guest
Attorney—Benjamin H. Sherman et al.

[57] ABSTRACT

A driven roll construction for a controlled deflection roll having a roll shell with a stationary shaft therein and fluid force transmission means between the shaft and shell with an extension ring at one end of the roll shell carrying an annular driving ring gear and a drive pinion in mesh with the ring gear with a pinion support member rotatably supporting the pinion and having a portion extending within the extension ring with a bearing between the extension ring and pinion support member to stabilize and carry the pinion relative to the ring gear.

10 Claims, 2 Drawing Figures

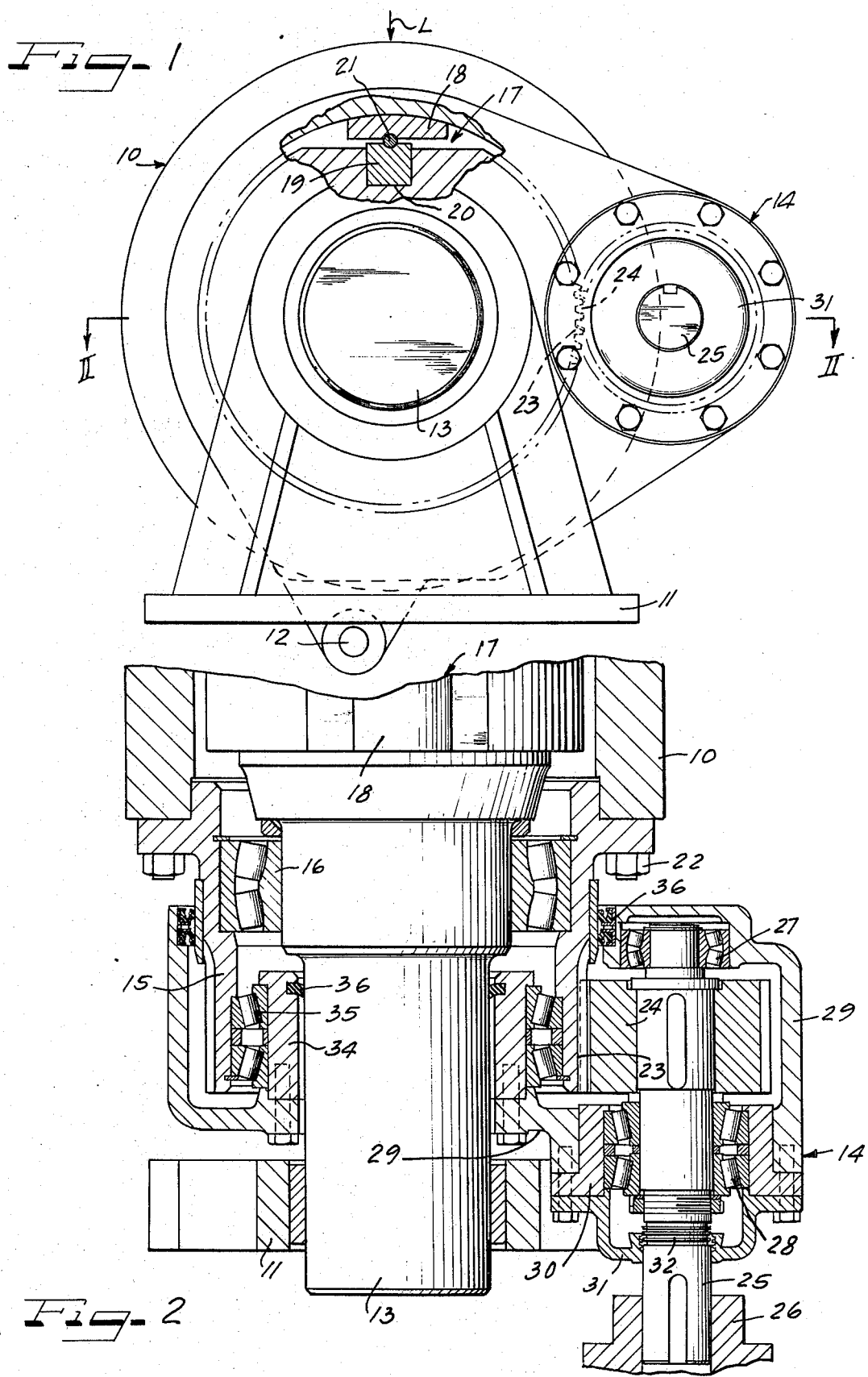

CONTROLLED DEFLECTION ROLL DRIVE

BACKGROUND OF THE INVENTION

The invention relates to improvements in roll drives and more particularly to an improved drive for a controlled deflection roll.

Controlled deflection rolls are used in various industries such as in paper making and textile and provide a roll which forms a pressure nip with a mating roll which is capable of operating at uniform pressure along the nip and is capable of adjustment to maintain the uniform nip pressure at varying loads. Such structures are used in the paper making industry, for example, in calender stacks, press sections and other locations of the machine. In a number of positions in the machines, the controlled deflection rolls must be driven in rotation. Such rotational drives ideally are compact so that the driving structure does not project or interfere with adjoining structures, and so that a minimum of operating space is required. Also, the driving construction must be capable of continued operation at high speeds without requiring attention for servicing or replacement. One of the problems encountered in constructing a drive for a controlled deflection roll is that the roll sheel and its supporting shaft deflect or bend relative to each other. Also, the roll sheel must be capable of being operated and driven while straight or while bent without adversely affecting the drive mechanism. Since the controlled deflection rolls frequently operate under heavy load conditions, the horsepower input through the drive mechanism is considerable, thus placing substantial requirements on the drive mechanism which must accommodate bending of the roll shell of the controlled deflection roll.

It is accordingly an object of the present invention to provide an improved compact reliable drive mechanism capable of driving a roll shell under high horsepower load requirements.

It is a further object of the present invention to provide a controlled deflection roll drive which drives through the end of a roll shell and requires a minimum of radial space requirements.

A still further object of the invention is to provide a roll shell drive mechanism capable of handling substantial amounts of driving power which will maintain the driving gears in accurate alignment avoiding the necessity of replacement and servicing attention.

Other objects and advantages will become more apparent as will equivalent structures which are intended to be covered herein, with the teaching of the principles of the invention in connection with the disclosure of the preferred embodiments in the specification, claims and drawings, in which:

DESCRIPTION OF THE DRAWINGS

FIG. 1 is an end elevational view of a roll and drive mechanism constructed in accordance with the principles of the present invention; and FIG. 2 is a fragmentary vertical sectional view taken substantially along line II—II of FIG. 1.

DESCRIPTION OF THE PREFERRED EMBODIMENTS

FIG. 1 shows a controlled deflection roll shell 10 which is rotatably supported on a stationary central through shaft 13. The shaft is supported at its ends on stands 11 and an arm 12 is secured at one end to the shaft to prevent rotation thereof. The roll shell is driven in rotation by driving mechanism 14.

As illustrated in FIG. 2, the roll shell is stabilized at its ends on the stationary shaft 13 by self-aligning bearings 16. In operation the roll shell will conventionally be used with another roll forming a nip therebetween with a load on the roll shell at the nip as indicated by the arrowed line L, FIG. 1.

As shown in FIG. 2, the load on the roll shell from the nip is transmitted to the shaft through a fluid force transmitting means extending along the length of the roll shell at the radial location opposite the nip load. These fluid force transmitting means may take various forms, and a preferred form is such as that shown in U.S. Pat. Justus No. 3,276,102. The fluid force transmission means functions to apply a uniform force under the principles of Pascal's law for the full axial length of the roll shell so that when the fluid pressure is increased to the desired amount to counteract the nip load, the shaft will bend downwardly within the roll shell while the roll shell will remain essentially straight, or be bowed upwardly slightly to maintain a uniform force along the nip. If the controlled deflection roll such as shown in the drawings is used with an opposing plain roll supported on end bearings, the opposing roll will bend upwardly and the roll shell will similarly have to be bent upwardly carrying a load on the self-aligning bearings 16, in order to maintain uniform force along the nip. The amount of bow in the roll shell will vary in accordance with the total nip load. It is, therefore, necessary for an end drive for the roll shell to accommodate the changes in amount of bending with changes in nip load.

At the end of the roll shell is connected an extension ring 15, such as by being secured thereto by bolts 22. The self-aligning bearings 16 are conveniently positioned between the end of the shaft and this extension ring 15.

The force transmitting means 17 includes a sliding bearing shoe 18 positioned opposite the nip load. This bearing shoe is carried on a piston 19 extending for the length of the shoe and having a roll pin 21 pivotally supporting the bearing shoe 18. The piston 19 is supported in a cylinder 20 extending for the length of the piston, and closed at its ends and supplied with oil under pressure to support the piston. The oil is supplied by a variable pressure pump, and the pressure is controlled in accordance with the total nip load to achieve the uniform nip pressure.

The drive mechanism 14 at the end of the roll shell includes an annular ring gear 23 supported on the extension ring 15. In the present arrangement, the extension ring is illustrated having the ring gear integral therewith by having the teeth cut into its outer surface.

For driving the ring gear, a driving pinion 24 is in mesh therewith. The pinion is carried on a stub shaft 25 which is driven by a flexible coupling 26 connected to a driving means such as a drive motor.

The pinion is maintained in accurate axial and radial alignment with the ring gear 23 by having the stub shaft supported on bearings 27 and 28 at each end of the pinion. The pinion is supported in a pinion support member comprising a number of parts which are stabilized or positioned by a bearing 35 carried radially within the ring gear. The support for the pinion includes a pinion housing 29 which carries one of the pinion bearings 27. The housing includes an annular part 30 which supports the other pinion bearing 28. The housing also includes an end cap 31 which provides a labyrinth oil seal with sealing rings 32 on the stub shaft 25. The housing part 30 is secured to pinion housing 29 which is mounted on a bearing ring 34 carrying the annular bearing 35. The bearing 35, being carried within the extension ring 15, is always maintained in alignment with the axial end of the roll shell. The bearing 35 thus positions its supporting ring 34, and the pinion housing 29 which supports the driving pinion 24. Thus, the pinion is always maintained in accurate axial and radial alignment with the ring gear 23 so that the driving forces transmitted through the pinion into the ring gear 23 are properly and accurately transmitted to the roll shell. As the roll shell bends upwardly or downwardly, the pinion will deflect, but will be maintained in axial and radial alignment with its ring gear.

With the pinion locating bearing 35 being carried inside of the roll shell, the pinion and its ring gear can be brought inwardly so that the meshing location between the gear teeth is at a close-in radial location thus reducing the radial space requirements of the drive. Bringing the meshing location inwardly reduces vibrational drive stresses and increases the stability of the entire unit. This is an important contribution to increasing the long wear of the unit, particularly at high horsepower loads.

A seal 36 is located between the shaft and the bearing ring 34 so that the same lubricant provided for the self-aligning bearings 16 can circulate and function to lubricate the annular bearing 35 and the bearings 27 and 28 for the pinion shaft. That is, the lubricating chambers for the pinion bearings, the annular bearing 35, and the self-aligning bearing are in communication.

In all features of the drive, the objective of compactness is attained and the operating parts are brought in close to the shaft and to the roll shell to reduce the size of the parts and to reduce the space required. The stability of the unit which reduces vibrations and wear will not only increase the wearing life of the unit, but will improve the operation of the controlled deflection roll inasmuch as it will reduce the vibrational possibility reaching the nip of the controlled deflection roll so as to improve the function and operation of the controlled deflection roll.

I claim as my invention:

1. A driven roll construction comprising in combination,
    a roll shell,
    support bearing means carrying the roll shell for rotation,
    an extension ring having an annular driving ring gear and being on an end of the roll shell for driving the shell,
    a drive pinion gear positioned radially outwardly of the ring gear and in mesh therewith for rotationally driving the roll shell,
    a pinion support member rotatably supporting said pinion and having a portion positioned radially inwardly of the extension ring,
    and a bearing between the extension ring and support member portion.

2. A driven roll construction in accordance with claim 1 wherein said bearing is located in substantial radial alignment with said ring gear.

3. A driven roll construction in accordance with claim 1 wherein said pinion support member includes a housing surrounding said pinion gear.

4. A driven roll construction in accordance with claim 1 wherein said roll shell includes a stationary shaft extending through the roll shell and force transmission means at one side of said shaft between the roll shell and shaft having fluid force transmitting means for applying an equal pressure along the axial length of the roll shell.

5. A driven roll constructed in accordance with claim 1 wherein said roll shell includes a stationary shaft extending therethrough with a shoe slidably supporting the roll shell on the shaft and a fluid piston and cylinder means supporting the shoe on the shaft for carrying the roll shell with a uniform force along its axial length.

6. A driven roll construction in accordance with claim 1 wherein said ring gear is carried on an extension ring on the end of the roll shell and said bearing is located between said extension ring and said pinion support member.

7. A driven roll construction in accordance with claim 1 including a flexible coupling drive for said pinion gear.

8. A driven roll construction in accordance with claim 1 wherein said pinion support member includes bearings at each end of said pinion gear.

9. A driven roll construction in accordance with claim 1 wherein said pinion support member includes a housing for the pinion gear with an oil seal between the extension ring and housing for maintaining lubricant between said pinion gear and ring gear.

10. A driven roll construction comprising in combination,
    a roll shell,
    a stationary shaft extending through said roll shell,
    deflection control means between the roll shell at one side thereof and the shaft and including a fluid force transmission means for transmitting the load from one radial location of the roll shell to the shaft,
    a self-aligning bearing between the shaft and roll shell,
    an annular driving ring gear on an end of the roll shell for driving the shell,
    a drive pinion gear positioned radially outwardly of the ring gear and in driving mesh therewith for rotationally driving the roll shell,
    a pinion support member rotatably supporting said pinion gear and having a portion extending axially within the ring gear,
    and a bearing between the ring gear and said support member for stabilizing the relative positions of the gears.

* * * * *